United States Patent [19]
Aoki et al.

[11] Patent Number: 4,717,584
[45] Date of Patent: Jan. 5, 1988

[54] METHOD OF MANUFACTURING A MAGNETIC THIN FILM

[75] Inventors: Masaki Aoki, Minou; Hideo Torii, Higashiosaka; Hideyuki Okinaka, Toyonaka; Masayuki Sakai, Minamikawachi, all of Japan

[73] Assignee: Matsushita Electric Industrial Co., Ltd., Osaka, Japan

[21] Appl. No.: 826,386

[22] Filed: Feb. 5, 1986

[30] Foreign Application Priority Data

| Feb. 7, 1985 | [JP] | Japan | 60-22269 |
| Apr. 19, 1985 | [JP] | Japan | 60-83775 |
| Jun. 12, 1985 | [JP] | Japan | 60-127406 |
| Jul. 26, 1985 | [JP] | Japan | 60-165123 |

[51] Int. Cl.$^4$ ............................................. B05D 3/06
[52] U.S. Cl. ...................... 427/38; 427/128; 427/255.3; 427/294
[58] Field of Search ............... 427/38, 128, 255.3, 427/294

[56] References Cited

U.S. PATENT DOCUMENTS 2,642,339  6/1953  Sawyer .
2,919,207 12/1959  Scholzel ............................ 117/106
4,466,258  8/1984  Sando et al. ....................... 427/38 X
4,557,944 12/1985  Arai et al. ......................... 427/39

OTHER PUBLICATIONS

Iwasaki et al., IEEE Transactions on Magnetics, vol. MAG-13, No. 5, pp. 1272-1277 (1977).
Iwasaki et al., IEEE Transactions on Magnetics, vol. MAG-14, No. 5, pp. 849-851 (1978).
Hoshi et al., The Transactions of The Institute of Electronics and Communication Engineers of Japan (C) J. 66-C, 1, pp. 9-16 (Jan., 1983).
Abe, Journal of Magnetics Society of Japan, vol. 8, No. 5 (1984), pp. 366-372.
Martens et al., IEEE Transactions of Magnetics, vol. MAG-20, No. 5, Sep. 1984, pp. 1007-1012.

Primary Examiner—Bernard D. Pianalto
Attorney, Agent, or Firm—Wenderoth, Lind & Ponack

[57] ABSTRACT

An organic metal compound containing elements constituting a magnetic material and an oxygen gas are introduced into plasmas at a low pressure and a thin film of magnetic oxide is prepared on an organic film or aluminum at low temperature.

11 Claims, 2 Drawing Figures

METHOD OF MANUFACTURING A MAGNETIC THIN FILM

BACKGROUND OF THE INVENTION

1. Field of the Invention

This invention concerns a magnetic thin film capable of recording data at high density for use in storage media such as video tapes, magnetic discs and optomagnetic discs, and a method of manufacturing the same.

2. Description of the Prior Art

Magnetic recording has been directed to higher density and digital recording in recent years. Magnetic recording method mainly employed so far has been the so-called interplaner magnetization method in which directions of easy magnetization exist on a plane of a magnetic recording medium. However, since the directions of magnetization in the magnetic recording medium are oriented so as to repell with each other as the recording density is increased in this system, it has been difficult to increase the recording density. In view of the above, a magnetic recording method called perpendicular magnetization, in which directions of easy magnetization are in the direction perpendicular to the plane of the magnetic recording medium, has been recently developed as a new magnetic recording method, which has enabled the art to outstandingly increase the recording density as disclosed in "An Analysis for the Magnetization Mode for High Density Magnetic Recording", by S. Iwasaki and Y. Nakamura, IEEE Transaction, Magn. MAG-13, No. 5, p 1272 (1977). A cobalt-chromium (Co-Cr) alloy film has been developed as the perpendicular magnetic recording recording medium mainly by a sputtering process as disclosed in "Co-Cr Recording Film with Perpendicular Magnetic Anisotropy", by S. Iwasaki and K. Ouchi, IEEE Transactions, Magn. MAG-14, 5, 849 (1978). In addition to the Co-Cr alloy, barium ferrite ($BaO.6Fe_2O_3$) has been obtained by the sputtering process as disclosed in "Structure and Magnetic Properties of C-Axis Well Oriented Ba-Ferrite Films Deposited by Targets-Facing Type of Sputtering", by Hoshi, Matsuoka, Naoe and Yamanaka, The Transactions of the Institute of Electronics and Communication Engineers of Japan (C), J. 66-C, 1, p 9–16 (January, 1983).

In these perpendicular magnetic recording media, although the Co-Cr alloy film can be prepared at a low temperature, the perpendicular magnetic anisotropy thereof as the measure for the magnitude of the perpendicular magnetization is smaller than that of barium ferrite and strontium ferrite. This causes a problem that no complete perpendicular magnetization film can be obtained, but some inplanar magnetized components remain. Further, since the Co-Cr alloy is a metal material, it is readily oxidized as other magnetic materials such as Fe and Co-Ni. While on the other hand, a substantially complete perpendicular magnetization film can be prepared with barium ferrite and strontium ferrite since a substantially complete C-axis oriented film can be obtained therewith. However, since the substrate temperature has to be 500° C. or higher for preparing a barium ferrite or strontium ferrite film, it is difficult to prepare strontium ferrite or barium ferrite on a polyimide or aluminum substrate.

While on the other hand, the perpendicular magnetization is necessary also in the optothermal magnetic recording for attaining high density recording.

However, the optothermal magnetic recording method is different from the magnetic recording method in that the change in the magnetic property due to heat application is utilized for recording and the optical effect relevant to the magnetic property is utilized for reproducing. That is, heat of a laser beam is utilized for recording and Kerr effect or Faraday's effect of the optomagnetic recording medium is utilized for reproduction as disclosed by Osamu Imamura, The Journal of the Institute of Television Engineers of Japan, Vol. 39, No. 4 (1985), p 365–368. Further, if an optomagnetic disc is used, for example, as the medium, a large Kerr effect (large Kerr rotation angle) is required in order to improve the SN ratio (signal to noise ratio) of the disc as disclosed in "A Guide To Getting Strong Magneto Optical Effect", Masanori Abe, Journal of Magnetics Society of Japan, Vol. 8, No. 5 (1984), p 366–372.

In view of the above, optomagnetic recording media with large Kerr rotation angle such as manganese-bismuth (MnBi), gadolinium-cobalt (GdCo) and gadolinium-terbium-iron (GdTbFe) have been developed by the vacuum deposition or sputtering process.

However, since these recording media utilize metal thin films such as Gd, Tb and Fe which are readily oxidized, they are considered not adaptable to external memory devices or the like for computers that require high reliability.

While on the other hand, it has been attempted to use ferromagnetic oxides, which are highly stable chemically, as the optomagnetic or magnetic recording (medium as disclosed by) J. W. D. Martens and A. B. Voermans, IEEE Transactions on Magnetics, vol. MAG-20 No. 5, September, 1984, and mainly cobalt ferrite films or oxide iron films are prepared by a heat treatment at 400° C.–800° C. using a sputtering or gas phase heat decomposing process (by H. Schmid in Austrian Pat. No. 162,382 (1949), and R. H. Sawyer in U.S. Pat. No. 2,642,339 (1953). In these optothermo magnetic recording media, although MnBi, GdCo and GdTbFe alloys can produce perpendicular magnetization films through synthesis at lower temperature, there has been a problem that the reliability is reduced due to the oxidation of the film. Particularly, in the case of using inexpensive substrates such as of polycarbonate or polyimide, these substrates are liable to adsorb water and, accordingly, the alloys may be oxidized due to the absorbed water.

While on the other hand, ferrites such as cobalt ferrite are free from oxidation of the film and, stable and inexpensive. However, since a heat treatment at 700° C.–800° C. (crystallization) is necessary upon preparing the film through sputtering or chemical vapor deposition process (CVD process) for obtaining a film of a large Kerr effect, it is difficult to use those substrates, for example, made of low melting glass, aluminum, polycarbonate and polyimide. In addition, since the ferrites such as cobalt ferrites have a spinel type isotropic crystal structure, there is a problem that they cannot form a perpendicular magnetization film by the crystal magnetic anisotropy such as in barium ferrite or Co-Cr.

SUMMARY OF THE INVENTION

An object of this invention is to provide a reliable magnetic oxide film.

Another object of this invention is to provide a method of manufacturing a reliable magnetic oxide film by use of a plasma chemical vapor deposition process on a substrate with a low heat resistivity such as an organic film or aluminum at a low temperature or without heating the substrate.

According to this invention, a magnetic oxide film is prepared at a low temperature or without heating the substrate not by way of conventional sputtering or chemical vapor deposition process, but by flowing a gas of an organic metal compound containing constituent elements for the magnetic material into high frequency plasmas, magnetron discharge plasmas or electron cyclotron resonance plasmas (ECR plasma) under a reduced pressure ($10-10^{-4}$ Torr), and by way of a plasma CVD process utilizing the activity of these plasmas.

Specifically, organic metal compounds containing elements constituting the magnetic material, for example, alkoxide compounds such as triethoxy iron ($Fe(OC_2H_5)_3$), triethoxy cobalt ($Co(OC_2H_5)_3$), diethoxy barium ($Ba(OC_2H_5)_2$), β-diketone complexes such as dipivaloyl methane barium ($Ba(DPM)_2$) (DPM=$C_{11}H_{19}O_2$), iron acetyl acetonate ($Fe(C_5H_7O_2)_3$), cobalt acetyl acetonate ($Co(C_5H_7O_2)_3$) and barium acetyl acetonate ($Ba(C_5H_7O_2)_2$) and ferrocene-like compounds such as bis(cyclopentadienyl)iron ($Fe(C_5H_5)_2$) and bis(cyclopentadienyl)cobalt ($Co(C_5H_5)_2$) in the form of vapors are introduced together with oxygen ($O_2$) as the reaction gas into a reaction vessel at a reduced pressure, and plasmas are generated in the reaction vessel to deposit magnetic oxide material on a substrate at a low temperature below 350° C.

For instance, when cobalt ferrite ($CoFe_2O_4$) is prepared through the reaction of iron acetyl acetonate, cobalt acetyl acetonate and oxygen, the reaction proceeds by the following reaction scheme:

$$8Fe(C_5H_7O_2)_3+4Co(C_5H_7O_2)_3+233O_2\rightarrow$$

$$4CoFe_2O_3+180CO_2+126H_2O$$

If the heat decomposing reaction is carried out under the normal pressure (760 Torr), a temperature at 500° C. or higher is required for the substrate, but the reaction can occur in plasmas at a temperature from 100° C. to 350° C. under a reduced pressure (10 Torr–$10^{-4}$ Torr), and, further, the reaction occurs at a temperature below 100° C. in high density plasmas such as magnetron discharge plasmas and electron cyclotron resonance plasmas.

The oxide magnetic film can thus be deposited under a low temperature, because there are present in plasmas many chemical species such as active radicals or ions that cause chemical reactions at low temperature, and the reaction that cannot occur in view of the energy in the usual heat CVD process is possible within the plasmas.

In addition, the plasma CVD process can synthesize high melting materials such as oxides, carbides and nitrides at low temperature as compared with the usual CVD process, and as well as can produce film of columnar structure at high purity and with good crystallinity even at a low temperature since this accompanies heat decomposing deposition. Thus, this is a most suitable method to render the magnetization film of isotropic crystal structure such as ferrites (horizontal magnetization film) into a perpendicular magnetization film on an organic film (since ferrites are isotropic crystals, perpendicular magnetization film is obtained by utilizing the perpendicular anisotropy caused by the configurational anisotropy due to the columnar structure of the film).

With the constitution as has been described above, a thin magnetic oxide film (perpendicular magnetic recording medium) can be obtained at a low temperature below 350° C. by skillfully utilizing the plasma activity in the method according to this invention.

DESCRIPTION OF THE PREFERRED EMBODIMENTS

Example 1

Figures 1, 2:
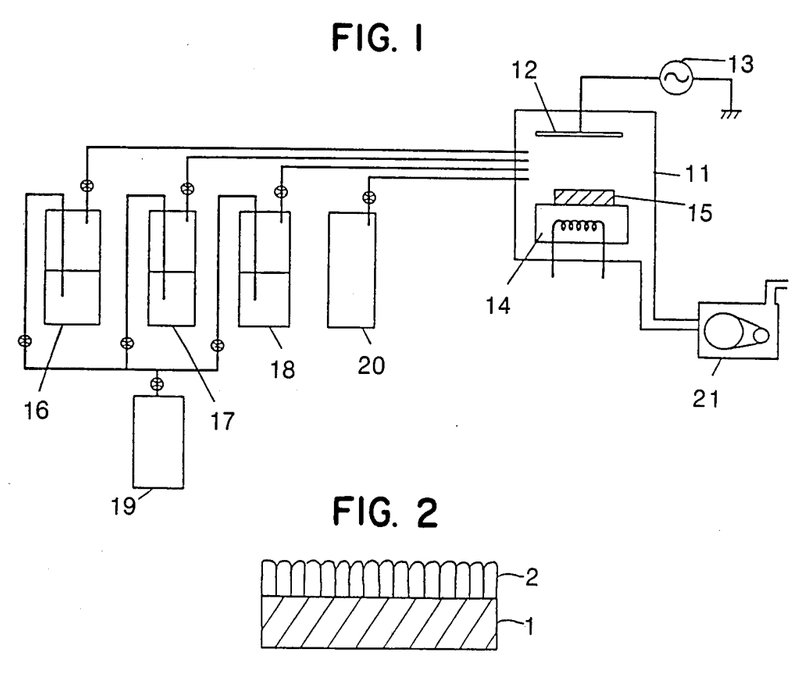
FIG. 1 is a schematic structural view of a plasma CVD device used in the manufacturing method according to this invention.
FIG. 2 is a schematic cross sectional view of a thin film of a magnetic oxide material obtained by the manufacturing method according to this invention.

FIG. 1 shows a schematic structural view of a plasma CVD device used according to this invention. In FIG. 1, there are shown a reaction chamber 11, a high frequency electrode 12, a high frequency power source 13, a substrate heating holder 14, a substrate 15 and bubblers 17, 18, 19 for raw material gases, an Ar carrier gas bomb 19, an $O_2$ reaction gas bomb 20 and a rotary pump 21.

At first, diethoxy barium ($Ba(OC_2H_5)_2$) and triethoxy iron ($Fe(OC_2H_5)_3$) as organic metal compounds were respectively charged in the bubblers 16 and 17 filled with ethanol ($C_2H_5OH$). A bubbling Ar gas 19 was caused to flow at 200 cc/minute and these vapors were introduced by means of the rotary pump 21 onto a polyimide substrate heated to 350° C. within the reaction chamber 11 under a reduced pressure. Then, oxygen 20 also as a reaction gas was caused to flow at a flow rate of 200 cc/min. also on a glass substrate and then introduced to the inside of the reaction chamber 11. The gas pressure was 10 Torr in this case. Then, high frequency power (13.65 MHz) was applied at 500 W (5 W/cm²) for 60 min. to cause a reaction.

The thickness of the barium ferrite film deposited on the polyimide substrate was about 2.5 μm. Magnetic properties of the film were then measured by X-ray analysis and VSM (vibration sample type magnetic force meter) and the results are shown in Tables 1 (a) and (b) as Sample No. 1.

In a similar manner, the result of the measurement for the film thickness, X-ray analysis and VSM while varying the substrate temperature, bubbler amount (Ar flow rate) of $Ba(OR)_2$ and $Fe(OR)_3$, pressure in the reaction chamber and high frequency power are shown in Tables 1 (a) and (b) as Sample Nos. 2–8. The Sample Nos. 9–16 represent Comparative Examples other than this invention.

X-ray analysis was conducted to examine whether the C-axis orientation had been obtained at the single phase of the barium ferrite. Further, from the result of VSM, the saturation magnetism and hysteresis curve (B-H curve) of the barium ferrite were obtained to determine the residual magnetism in the perpendicular direction and the residual magnetism in the horizontal direction. (If the residual magnetism in the perpendicular direction is larger compared with the residual magnetism in the horizontal direction, the perpendicular magnetization film is more excellent.

TABLE 1(a)

| Sample No. | Type of Ba alkoxide | Type of iron alkoxide | Argon gas flow rate (cc/min) | Reaction gas and its flow rate (cc/min) | | Inside pressure of chamber (Torr) |
|---|---|---|---|---|---|---|
| 1 | $Ba(OC_2H_5)_2$ | $Fe(OC_2H_5)_3$ | 200 | $O_2$ | 200 | 10.0 |
| 2 | | | 100 | $O_2$ | 100 | 3.0 |
| 3 | | | 30 | $O_2$ | 30 | 0.5 |
| 4 | | | 10 | $O_2$ | 10 | 0.1 |
| 5 | | | 50 | $O_2$ | 50 | 1.0 |
| 6 | $Ba(OC_3H_7)_2$ | $Fe(OC_3H_7)_3$ | 30 | $CO_2$ | 30 | 0.4 |
| 7 | $Ba(OCH_3)_2$ | $Fe(OCH_3)_3$ | | | | |
| 8 | $Ba(OC_4H_9)_2$ | $Fe(OC_4H_9)_3$ | | | | |
| 9* | $Ba(OC_2H_5)_2$ | $Fe(OC_2H_5)_3$ | | | | |
| 10* | | | | $O_2$ | 30 | |
| 11* | | | 300 | $O_2$ | 300 | 15.0 |
| 12* | | | 5 | $O_2$ | 5 | 0.08 |
| 13* | | | 30 | $CO_2$ | 30 | 0.4 |
| 14* | Co—Cr alloy (20 atomic % Cr) sputtered film | | | | | |
| 15* | Co—Cr alloy (20 atomic % Cr) vapor deposited film | | | | | |
| 16* | Barium ferrite sputtered film | | | | | |

*Sample Nos. 9–16 are Comparative Examples.

TABLE 1(b)

| Sample No. | Substrate temperature (°C.) | Film thickness (μm) | HF power (W/cm²) | Result of X-ray analysis | Residual magnetization: perpendicular (emu/cc) | Residual magnetization: horizontal (emu/cc) | Saturation magnetization (emu/cc) |
|---|---|---|---|---|---|---|---|
| 1 | 350 | 2.5 | 5 | Single | 365 | 50 | 370 |
| 2 | 330 | 2.0 | 10 | phase | 370 | 40 | 375 |
| 3 | 300 | 0.8 | 1 | C-axis | 360 | 50 | 365 |
| 4 | 250 | 0.5 | 0.5 | oriented | 353 | 54 | 360 |
| 5 | 340 | 1.0 | 5 | | 372 | 35 | 380 |
| 6 | 300 | 1.0 | 5 | | 370 | 32 | 375 |
| 7 | 200 | 0.9 | 8 | | 365 | 35 | 368 |
| 8 | 350 | 1.2 | 6 | | 350 | 48 | 352 |
| 9* | | 1.0 | 0.4 | Ba ferrite $\alpha$-$Fe_2O_3$ | 250 | 250 | 260 |
| 10* | 300 | 0.9 | 12 | Ba ferrite $Fe_3O_4$ | 280 | 275 | 290 |
| 11* | 340 | 1.0 | 5 | Ba ferrite $\alpha$-$Fe_2O_3$ | 215 | 220 | 220 |
| 12* | 330 | 0.2 | | Ba ferrite $Fe_3O_4$ | 282 | 278 | 290 |
| 13* | 150 | 1.0 | | amorphous | 52 | 58 | 60 |
| 14* | 150 | 1.0 | | h.c.p | 350 | 300 | 390 |
| 15* | 300 | 1.0 | | h.c.p | 280 | 200 | 300 |
| 16* | 590 | 1.0 | | Ba ferrite single phase | 365 | 55 | 370 |

Example 2

In the plasma CVD device shown in FIG. 1, the bubbler 16 was used for $Sr(OR)_2$ and the bubbler 17 was used for $Fe(OR)_3$.

At first, diethoxy strontium ($Sr(OC_2H_5)_2$) and triethoxy iron ($Fe(OC_2H_5)_3$) were placed in the bubblers 16 and 17 containing ethanol ($C_2H_5OH$) respectively (30 wt% solution of $Sr(OC_2H_5)_2$ and $Fe(OC_2H_5)_3$). Bubbling argon gas was caused to flow at 20 cc/min and 200 cc/min respectively, and these vapors were introduced onto a polyimide substrate heated to 350° C. in the reaction chamber 11 under a reduced pressure. Then, oxygen 20 as another reaction gas was caused to flow at a flow rate of 200 cc/min also on a glass substrate and introduced to the inside of the reaction chamber 11. The gas pressure was 10 Torr. Then, high frequency power (13.65 MHz) was applied at 500 W (5 W/cm²) for 60 minutes to cause reaction.

The thickness of the strontium ferrite film deposited on the polyimide substrate was about 2.0 μm. Then, magnetic properties of the film were measured by X-ray analysis and VSM (vibration sample type magnetic force meter). The results are shown in Tables 2 (a) and (b) as Sample No. 1.

In a similar manner, the result of the measurement for the film thickness, X-ray analysis and VSM while varying the substrate temperature, bubbler amount (Ar flow rate) of $Ba(OR)_2$ and $Fe(OR)_3$, pressure in the reaction chamber, high frequency power, etc. are shown in Tables 2 (a) and (b) as Sample Nos. 2–8. The Sample Nos. 9–16 represent Comparative Examples other than this invention.

X-ray analysis was conducted to examine whether the C-axis orientation has been obtained at the single phase of the strontium ferrite. Further, from the results of VSM, the saturation magnetization and hysteresis curve (B-H curve) of the strontium ferrite were determined to obtain the residual magnetism in the perpendicular direction and the residual magnetism in the horizontal direction. (If the residual magnetism in the perpendicular direction is larger than the residual magnetism in the horizontal direction, the perpendicular magnetism film is more excellent.

TABLE 2(a)

| Sample No. | Type of Sr alkoxide | Type of Fe alkoxide | Ar flow rate in $Sr(OR)_n$ bubbler (CC/min) | Ar flow rate in $Fe(OR)_n$ bubbler (CC/min) | $O_2$ gas flow rate (CC/min) | Pressure in chamber (Torr) |
|---|---|---|---|---|---|---|
| 1 | $Sr(OC_2H_5)_2$ | $Fe(OC_2H_5)_3$ | 20 | 200 | 200 | 10.0 |
| 2 | | | 10 | 100 | 100 | 3.0 |
| 3 | | | 3 | 30 | 30 | 0.5 |
| 4 | | | 1 | 10 | 10 | 0.1 |
| 5 | | | 5 | 50 | 50 | 1.0 |
| 6 | $Sr(OC_3H_7)_2$ | $Fe(OC_3H_7)_3$ | 3 | 30 | 30 | 0.5 |
| 7 | $Sr(OCH_3)_2$ | $Fe(OCH_3)_3$ | | | | |
| 8 | $Sr(OC_4H_9)_2$ | $Fe(OC_4H_9)_3$ | | | | |
| 9* | $Sr(OC_2H_5)_2$ | $Fe(OC_2H_5)_3$ | | | | |
| 10* | | | | | | |
| 11* | | | 30 | 300 | 300 | 15.0 |
| 12* | | | 0.5 | 5 | 5 | 0.08 |
| 13* | | | 3.0 | 30 | 30 | 0.5 |
| 14* | Co—Cr alloy | (20 atomic % Cr) sputtered film | | | | |
| 15* | Co—Cr alloy | (20 atomic % Cr) vapor deposited film | | | | |
| 16* | Barium ferrite sputtered film | | | | | |

*Sample Nos. 9–16 are Comparative Examples.

TABLE 2(b)

| Sample No. | Substrate temperature (°C.) | Film thickness (μm) | HF power (W/cm²) | Results of X-ray analysis | Residual magnetization: perpendicular (emu/CC) | Residual magnetization: horizontal (emu/CC) | Saturation magnetization (emu/CC) |
|---|---|---|---|---|---|---|---|
| 1 | 350 | 2.0 | 5 | Sr ferrite | 370 | 55 | 375 |
| 2 | 330 | 2.0 | 10 | single | 372 | 56 | 380 |
| 3 | 300 | 0.8 | 1 | phase | 365 | 50 | 370 |
| 4 | 250 | 0.5 | 0.5 | C-axis | 359 | 52 | 365 |
| 5 | 340 | 1.0 | 5 | | 375 | 50 | 382 |
| 6 | 300 | 1.0 | 5 | | 370 | 52 | 376 |
| 7 | 200 | 0.8 | 8 | | 368 | 51 | 373 |
| 8 | 350 | 1.3 | 6 | | 355 | 48 | 365 |
| 9* | " | 1.0 | 0.4 | Sr ferrite + α-$Fe_2O_3$ | 250 | 250 | 260 |
| 10* | 300 | 0.9 | 12 | Sr ferrite + $Fe_3O_4$ | 280 | 275 | 290 |
| 11* | 350 | 1.0 | 5 | Sr ferrite + α-$Fe_2O_3$ | 214 | 215 | 220 |
| 12* | 330 | 0.2 | | Sr ferrite + $Fe_3O_4$ | 262 | 258 | 270 |
| 13* | 150 | 1.0 | | amorphous | 58 | 60 | 64 |
| 14* | 150 | 1.0 | | H. C. P. | 350 | 300 | 390 |
| 15* | 300 | 1.0 | | H. C. P. | 280 | 200 | 300 |
| 16* | 590 | 1.0 | | Ba, ferrite single phase | 365 | 55 | 370 |

*Sample Nos. 9–16 are Comparative Examples.

Example 3

In the plasma CVD device shown in FIG. 1, the bubbler 16 was used for $Fe(OR)_3$ or a mixture of $Fe(C_5H_7O_2)_3$ and $Ba(OR)_2$ or $Ba(C_5H_7O_2)_2$; the bubbler 17 was used for $Co(OR)_3$ or $Co(C_5H_7O_2)_3$; and the bubbler 18 was used for $Zn(OR)_4$ or $Zn(C_5H_7O_2)_2$.

At first the bubbler 16 containing a mixture of triethoxy iron ($Fe(OC_2H_5)_3$) and diethoxy barium ($Ba(OC_2H_5)_2$) and the bubblers 17, 18 containing diethoxy cobalt ($Co(OC_2H_5)_3$) and diethoxy zinc ($Zn(OC_2H_5)_2$) were heated to 150° C. Bubbling argon gas 18 was caused to flow at 250 cc/min, 80 cc/min, 10 cc/min and 10 cc/min respectively to these bubblers, and these vapors were introduced by way of a rotary pump on a polyimide substrate heated to 345° C. in the reaction chamber 11 under a reduced pressure. Then, oxygen 20 as another reaction gas was caused to flow at a flow rate of 250 cc/min also on the polyimide substrate. The gas pressure was 10 Torr. Then, high frequency power (13.65 MHz) was applied at 500 W (5 W/cm²) for 60 minutes to cause a reaction.

The thickness of the hexagonal ferrite film deposited on the polyimide substrate was about 2.4 μm. Then, magnetic properties of the film were measured by X-ray analysis and VSM (vibration sample type magnetic force meter). The results are shown in Tables 3 (a)–(d) as Sample No. 1. In a similar manner, the results of the measurement for the film thickness, X-ray analysis and VSM while varying the substrate temperature, bubbler amount (Ar flow rate) for $Ba(OR)_2$ and $Fe(OR)_3$, pressure in the reaction chamber, high frequency power, etc. are shown in Tables 3 (a)–(d) as Sample Nos. 2–12. The Sample Nos. 13–19 represent Comparative Examples other than this invention.

X-ray analysis was conducted to examine whether the C-axis orientation had been obtained at the single phase of the hexagonal ferrite. Further, from the results of VSM, the saturation magnetization and hysteresis curve (B-H curve) of the hexagonal ferrite were determined to obtain the residual magnetism in the perpendicular direction and the residual magnetism in the horizontal direction. (If the residual magnetism in the perpendicular direction is larger than the residual magnetism in the horizontal direction, the perpendicular magnetization film is more excellent.

TABLE 3(a)

| Sample No. | Type of Fe—containing compound | Type of Ba—containing compound | Type of Co—containing compound | Type of Zn—containing compound |
|---|---|---|---|---|
| 1 | Fe(OC$_2$H$_5$)$_3$ | Ba(OC$_2$H$_5$)$_2$ | Co(OC$_2$H$_5$)$_3$ | Zn(OC$_2$H$_5$)$_2$ |
| 2 | | | | |
| 3 | | | | |
| 4 | | | | |
| 5 | | | | |
| 6 | | | | |
| 7 | Fe(OC$_3$H$_7$)$_3$ | Ba(OC$_3$H$_7$)$_2$ | Co(OC$_3$H$_7$)$_3$ | Zn(OC$_3$H$_7$)$_2$ |
| 8 | Fe(OCH$_3$)$_3$ | Ba(OCH$_3$)$_2$ | Co(OCH$_3$)$_3$ | Zn(OCH$_3$)$_2$ |
| 9 | Fe(OC$_4$H$_9$)$_3$ | Ba(OC$_4$H$_9$)$_2$ | Co(OC$_4$H$_9$)$_3$ | Zn(OC$_4$H$_9$)$_2$ |
| 10 | Fe(C$_5$H$_7$O$_2$)$_3$ | Ba(C$_5$H$_7$O$_2$)$_2$ | Co(C$_5$H$_7$O$_2$)$_3$ | Zn(C$_5$H$_7$O$_2$)$_2$ |
| 11 | | | | |
| 12 | | | | |
| 13* | Fe(OC$_2$H$_5$)$_3$ | Ba(OC$_2$H$_5$)$_2$ | Co(OC$_2$H$_5$)$_3$ | Zn(OC$_2$H$_5$)$_2$ |
| 14* | | | | |
| 15* | | | | |
| 16* | | | | |
| 17* | | | | |
| 18* | | | | |
| 19* | Barium ferrite sputtered film | | | |

*Sample Nos. 13–19 are Comparative Examples

TABLE 3(b)

| Sample No. | Ar gas flow rate for Fe compound bubble (cc/min) | Ar gas flow rate For Ba compound bubble (cc/min) | Ar gas flow rate for Co compound bubble (cc/min) | Ar gas flow rate for Zn compound bubble (cc/min) |
|---|---|---|---|---|
| 1 | 250 | 80 | 10 | 10 |
| 2 | 160 | 40 | 10 | 10 |
| 3 | 80 | 20 | 5 | 5 |
| 4 | 15 | 5 | 2 | 2 |
| 5 | 50 | 20 | 15 | 15 |
| 6 | 5 | 1 | 1 | 1 |
| 7 | 30 | 10 | 3 | 3 |
| 8 | | | | |
| 9 | | | | |
| 10 | 250 | 80 | 10 | 10 |
| 11 | 60 | 20 | 15 | 15 |
| 12 | 5 | 2 | 1 | 1 |
| 13* | 30 | 10 | 3 | 3 |
| 14* | 300 | 50 | 10 | 10 |
| 15* | 3 | 0.5 | 0.5 | 0.5 |
| 16* | 30 | 10 | 3 | 3 |
| 17* | | | | |
| 18* | 30 | 10 | | |
| 19* | Barium ferrite sputtered film | | | |

*Sample Nos. 13–19 are Comparative Examples.

TABLE 3(c)

| Sample No. | O$_2$ flow rate (cc/min) | Pressure in the chamber (Torr) | Substrate temperature (C) | HF power (W/cm) |
|---|---|---|---|---|
| 1 | 250 | 10.0 | 345 | 5 |
| 2 | 150 | 6.6 | 330 | 10 |
| 3 | 80 | 3.1 | 300 | 1 |
| 4 | 15 | 0.5 | 250 | 0.5 |
| 5 | 50 | 1.5 | 300 | 5 |
| 6 | 5 | 0.1 | 300 | 5 |
| 7 | 30 | 1.3 | | |
| 8 | | | 200 | |
| 9 | | | 350 | |
| 10 | 250 | 10.0 | 330 | |
| 11 | 60 | 1.6 | | |
| 12 | 5 | 0.1 | | |
| 13* | 30 | 1.3 | 345 | 0.4 |
| 14* | 300 | 15.0 | | 5 |
| 15* | 3 | 0.05 | | |
| 16* | 30 | 1.3 | 150 | |
| 17* | | | 345 | 15 |
| 18* | 30 | 1.0 | 300 | 5 |
| 19* | Barium ferrite sputtered film | | 590 | |

*Sample Nos. 13–19 are Comparative Examples.

TABLE 3(d)

| Sample No. | Result of X-ray analysis | Residual magnetization: perpendicular (emu/cc) | Residual magnetization: horizontal (emu/cc) | Retentiveness in Perpendicular direction (Oe) |
|---|---|---|---|---|
| 1 | hexagonal | 375 | 53 | 1572 |
| 2 | ferrite | 382 | 56 | 1458 |
| 3 | | 374 | 52 | 1203 |
| 4 | | 368 | 54 | 946 |
| 5 | | 383 | 58 | 1325 |
| 6 | | 362 | 53 | 881 |
| 7 | | 381 | 52 | 1053 |
| 8 | | 373 | 48 | 825 |
| 9 | | 364 | 55 | 996 |
| 10 | | 373 | 57 | 1351 |
| 11 | | 381 | 61 | 1412 |
| 12 | | 363 | 50 | 1210 |
| 13* | hexagonal ferrite + COFe$_2$O$_4$ | 225 | 231 | 526 |
| 14* | deposition of powdery substance | | | |
| 15* | Fe$_3$O$_4$ + Fe$_2$O$_3$ | 205 | 204 | 352 |
| 16* | amorphous | 45 | 43 | 101 |
| 17* | hexagonal ferrite + Fe$_3$O$_4$ | 243 | 245 | 625 |
| 18* | barium | 362 | 51 | 2135 |
| 19* | ferrite | 365 | 55 | 2118 |

*Sample Nos. 13–19 are Comparative Example

Example 4

In the plasma CVD device shown in FIG. 1, the bubbler 16 was used for cobalt-containing alkoxide or cobalt-containing β-diketone metal chelate; the bubbler 17 was used for iron-containing alkoxide or iron-containing metal chelate; and the bubbler 18 was used for M-containing alkoxide (where M is one of Al, Cr, Gd, Mn and In) or M-containing metal chelate.

At first, triethoxy cobalt (Co(OC$_2$H$_5$)$_3$), triethoxy iron (Fe(OC$_2$H$_5$)$_3$) and triethoxy aluminum, (Al- ($OC_2H_5)_3$) were charged in the bubblers 16, 17 and 18 heated to 150° C. respectively. Bubbling argon gas 19 was caused to flow at 100 cc/min, 200 cc/min and 5 cc/min respectively and the vapors were introduced onto the aluminum substrate 15 heated to 300° C. in the reaction chamber 11 at a reduced state. Then, oxygen ($O_2$) 20 as another reaction gas was caused to flow at a flow rate of 200 cc/min also on the aluminum substrate to conduct reaction for 6 minutes. The gas pressure was 1.0 Torr and the high frequency power (13.56 MHz) was 500 W (5 W/cm$^2$). The thickness of the cobalt ferrite film deposited on the substrate was 2100 Å and then $SiO_2$ film was deposited thereover to 2150 Å by sputtering. Then, X-ray analysis for the crystal structure and the measurement of the Kerr rotation angle (measured for entering laser beams at wavelength of 780 nm onto the $SiO_2$ film, reflecting at the aluminum surface and then detecting the laser beams permeated through the $SiO_2$ film again for measurement) were carried out. The results are shown in Tables 4 (a) and (b) as Sample No. 1.

In the same manner, the results of the X-ray analysis and the Kerr effect (magnitude of the Kerr rotation angle) were measured while varying the substrate temperature, type of the alkoxide, type of the β-diketone metal chelate, amount of bubbler (Ar flow rate), pressure in the reaction chamber, high frequency power, etc. are shown in Tables 4 (a) and (b) as Sample Nos. 2-21. Sample Nos. 22-25 are Comparative Examples other than this invention.

force meter) whether the cobalt ferrite film was perpendicular magnetization film or not.

TABLE 4(a)

| Sample No. | Type of Co— containing compound | Type of Fe— containing compound | Type of M— containing compound | $N_2$ gas flow rate of Co— compound bubbler (cc/min) |
|---|---|---|---|---|
| 1 | $Co(OC_2H_5)_2$ | $Fe(OC_2H_5)_3$ | $Al(OC_2H_5)_3$ | 100 |
| 2 | | | | |
| 3 | | | | |
| 4 | $Co(C_5H_7O_2)_3$ | $Fe(C_5H_7O_2)_3$ | $Al(C_5H_7O_2)_3$ | 150 |
| 5 | | | $Cr(C_5H_7O_2)_3$ | |
| 6 | | | | |
| 7 | | | | |
| 8 | | | $Fe(OC_2H_5)_3$ | 100 |
| 9 | | | $Fe(C_5H_7O_2)_3$ | |
| 10 | | | $Gd(C_5H_7O_2)_3$ | 150 |
| 11 | | | | |
| 12 | | | | |
| 13 | | | $Gd(OC_2H_5)_3$ | 100 |
| 14 | | | $Mn(C_5H_7O_2)_3$ | 150 |
| 15 | | | | |
| 16 | | | | |
| 17 | | | $Mn(OC_2H_5)_3$ | 100 |
| 18 | | | $In(C_5H_7O_2)_3$ | 150 |
| 19 | | | | |
| 20 | | | | |
| 21 | | | $In(OC_2H_5)_3$ | 100 |
| 22* | | | $Al(C_5H_7C_2)_3$ | 150 |
| 23* | | | $Gd(C_5H_7O_2)_3$ | |
| 24* | | | $Mn(C_5H_7O_2)_3$ | |
| 25* | | | $In(C_5H_7O_2)_3$ | |

(*Sample Nos. 22-25 are Comparative Example)

TABLE 4(b)

| Sample No. | Substrate temperature (°C.) | HF power (W/cm$^2$) | Result of X-ray analysis | | Kerr-rotation angle (in 780 nm wavelength (degree) |
|---|---|---|---|---|---|
| 1 | 300 | 5 | cobalt ferrite single phase | $CoFe_{1.9}Al_{0.1}O_4$ | 4.2 |
| 2 | | | | $CoFe_{1.6}Al_{0.4}O_4$ | 4.5 |
| 3 | | | | $CoFe_{1.0}Al_{1.0}O_4$ | 4.8 |
| 4 | 350 | 3 | | $CoFe_{1.8}Al_{0.2}O_4$ | 4.3 |
| 5 | 340 | 3 | | $CoFe_{1.9}Cr_{0.1}O_4$ | 5.1 |
| 6 | 330 | 5 | | $CoFe_{1.8}Cr_{0.2}O_4$ | 5.3 |
| 7 | 350 | 2 | | $CoFe_{1.0}Cr_{1.0}O_4$ | 5.0 |
| 8 | 250 | 6 | | $CoFe_2O_4$ | 6.3 |
| 9 | | 6 | | $CoFe_2O_4$ | 6.2 |
| 10 | | 1 | | $CoFe_{1.9}Gd_{0.1}O_4$ | 6.0 |
| 11 | | 3 | | $CoFe_{1.84}Gd_{0.16}O_4$ | 6.5 |
| 12 | | | | $CoFe_{1.0}Gd_{1.0}O_4$ | 6.1 |
| 13 | | | | $CoFe_{1.2}Gd_{0.8}O_4$ | 5.8 |
| 14 | | | | $CoFe_{1.9}Mn_{0.1}O_4$ | 6.5 |
| 15 | 300 | | | $CoFe_{1.81}Mn_{0.19}O_4$ | 6.7 |
| 16 | | 5 | | $CoFe_{1.0}Mn_{1.0}O_4$ | 6.2 |
| 17 | | | | $CoFe_{1.2}Mn_{0.8}O_4$ | 6.4 |
| 18 | | | | $CoFe_{1.9}In_{0.1}O_4$ | 6.1 |
| 19 | | | | $CoFe_{1.8}In_{0.2}O_4$ | 6.5 |
| 20 | | | | $CoFe_{1.0}In_{1.0}O_4$ | 6.1 |
| 21 | | | | $CoFe_{1.2}In_{0.8}O_4$ | 6.2 |
| 22* | | | | $CoFe_{0.7}Al_{1.3}O_4$ | 3.2 |
| 23* | | | | $CoFe_{0.71}Gd_{1.29}O_4$ | 2.4 |
| 24* | | | | $CoFe_{0.7}Mn_{1.3}O_4$ | 2.8 |
| 25* | | | | $CoFe_{0.6}In_{1.4}O_4$ | 2.5 |

(*Sample Nos. 22-25 are Comparative Examples.)

The X-ray analysis was carried out for examining the crystal structure and the orientation of the film of the cobalt ferrite, as well as the solid-solubilized state of the additives M (where M represents one of Al, Cr, Fe, Gd, Mn and In). The Kerr effect (magnitude of the Kerr rotation angle) was examined by a polarized plane modulation method (for example, as disclosed by Imamura in the Journal of the Institute of Television Engineers of Japan, Vol. 39, No. 4, 1985, 366 p). Further, it was also examined by the magnetic property of the film (B-H curve) due to VSM (vibration sample type magnetic

Example 5

In the plasma CVD device shown in FIG. 1, the bubbler 16 was used cobalt-containing chelate; the bubbler 17 was used for iron-containing iron-chelate; and the bubbler 18 was used for M-containing chelate (where M is one of Al, Cr, Gd, Mn and In).

At first, cobalt acetyl acetonate ($Co(C_5H_7O_2)_3$), acetyl acetonate ($Fe(C_5H_7O_2)_3$) and aluminum acetyl acetonate were charged to the bubblers 16, 17 and 18 heated to 150° C. respectively. Bubbling argon gas 19 was caused to flow at 80 cc/min, 120 cc/min and 4 cc/min respectively, and these vapors were introduced by way of the rotary pump 21 onto the aluminum substrate 15 in the reaction chamber 11 at a reduced state. Then, oxygen ($O_2$) 20 as another reaction gas was caused to flow at a flow rate of 200 cc/min also on the aluminum substrate to cause reaction for about 25 minutes. The gas pressure was $1.1 \times 10^{-2}$ Torr and the high frequency power (13.56 MHz) was 500 W (5 W/cm$^2$). The magnetic force of the magnet for magnetron discharge was about 500 gauss near the substrate. The thickness of the cobalt ferrite film deposited on the substrate was 2250 Å. Then, X-ray analysis for the crystal structure and the measurement of the Kerr rotating angle (by entering laser beams at wavelength of 780 nm onto the ferrite film, reflecting at the aluminum surface and detecting the laser beams permeated through the ferrite film again for measurement) were carried out. The results are shown in Table 5 as Sample No. 1.

In the same manner, the results of the X-ray analysis and the Kerr effect (magnitude of the Kerr rotation angle) were measured while varying the substrate temperature, type of the chelate, amount of bubbler (Ar flow rate), pressure in the reaction chamber (by varying the valve operation to the rotary pump), method of generating plasmas, etc. are shown in Table 5 as Sample Nos. 2–24. Sample Nos. 25, 26 are Comparative Examples other than this invention.

The X-ray analysis was carried out for examining the crystal structure and the orientation of the film of the cobalt ferrite, as well as the solid solubilized state of the additives M (where M represents one of Al, Cr, Fe, Gd, Mn and In). The Kerr effect (magnitude of the Kerr rotation angle) was examined by a polarized plane modifying method (for instance, as disclosed by Imamura, the Journal of the Institute of Television Engineers of Japan, Vol. 39, No. 4, 1985, 366p). Further it was also examined by the magnetic property (B-H curve) of the film due to VSM (vibration sample type magnetic force meter) whether the cobalt ferrite film was perpendicular magnetization film or not.

TABLE (5)a

| Sample No. | Type of co-containing chelate | Type of Fe— containing chelate | Type of M— containing chelate | $N_2$ gas flow rate for co-containing chelate bubbling (cc/min) | $N_2$ gas flow rate Fe— containing chelate bubbling (cc/min) | $N_2$ gas flow rate containing chelate bubbling (cc/min) | $O_2$ flow rate (cc/min) |
|---|---|---|---|---|---|---|---|
| 1 | Co($C_5H_7O_2$)$_2$ | Fe($C_5H_7O_2$)$_3$ | Al($C_5H_7O_2$)$_3$ | 80 | 120 | 4 | 200 |
| 2 | | | | 80 | 120 | 20 | 250 |
| 3 | | | | 80 | 120 | 35 | 200 |
| 4 | | | | 80 | 120 | 100 | 250 |
| 5 | | | Cr($C_5H_7O_2$)$_3$ | 50 | 30 | 6 | 100 |
| 6 | | | | 50 | 30 | 15 | 100 |
| 7 | | | | 50 | 30 | 150 | 100 |
| 8 | Co($C_{11}H_{19}O_2$)$_2$ | Fe($C_{11}H_{19}O_2$)$_3$ | Fe($C_{11}H_{19}O_2$)$_2$ | 50 | 100 | 2.5 | 100 |
| 9 | Co($C_5H_7O_2$)$_2$ | Fe($C_5H_7O_2$)$_3$ | Fe($C_5H_7O_2$)$_2$ | 50 | 100 | 2.5 | 150 |
| 10 | | | Gd($C_5H_7O_2$)$_3$ | 50 | 100 | 8 | 150 |
| 11 | | | | 50 | 100 | 12 | 150 |
| 12 | | | | 50 | 100 | 155 | 150 |
| 13 | Co($C_{11}H_{19}O_2$)$_2$ | Fe($C_{11}H_{19}O_2$)$_3$ | Gd($C_{11}H_{19}O_2$)$_3$ | 50 | 100 | 8 | 150 |
| 14 | Co($C_5H_7O_2$)$_2$ | Fe($C_5H_7O_2$)$_3$ | Mn($C_5H_7O_2$)$_3$ | 20 | 50 | 2 | 100 |
| 15 | | | | 50 | 100 | 12 | 150 |
| 16 | | | | 50 | 100 | 150 | 150 |
| 17 | Co($C_{11}H_{19}O_2$)$_2$ | Fe($C_{11}H_{19}O_2$)$_3$ | Mn($C_{11}H_{19}O_2$)$_3$ | 50 | 100 | 150 | 150 |
| 18 | Co($C_5H_7O_2$)$_2$ | Fe($C_5H_7O_2$)$_3$ | In($C_5H_7O_2$)$_3$ | 50 | 100 | 150 | 150 |
| 19 | | | | 50 | 100 | 150 | 150 |
| 20 | | | | 50 | 100 | 150 | 150 |
| 21 | Co($C_{11}H_{19}O_2$)$_2$ | Fe($C_{11}H_{19}O_2$)$_3$ | In($C_{11}H_{19}O_2$)$_3$ | 50 | 100 | 150 | 150 |
| 22 | Co($C_5H_7O_2$)$_2$ | Fe($C_5H_7O_2$)$_3$ | Fe($C_5H_7O_2$)$_3$ | 50 | 100 | 2.5 | 150 |
| 23 | Co($C_5H_5$)$_2$ | Fe($C_5H_5$)$_2$ | Fe($C_5H_5$)$_2$ | 20 | 50 | 2.0 | 100 |
| 24 | | | | 50 | 100 | 12 | 150 |
| 25* | | | | 50 | 100 | 12 | 150 |
| 26* | | | | 50 | 100 | 12 | 150 |

*Sample Nos. 25, 26 are comparative examples.

TABLE 5(b)

| Sample No. | Film thickness (Å) | Pressure chamber (Torr) | Substrate temp (°C.) | Type of Plasma | result of X-ray analysis | | Kerr rotation angle (780 nm wavelength (degree) |
|---|---|---|---|---|---|---|---|
| 1 | 2250 | $1.1 \times 10^{-2}$ | 40 | magnetron discharge plasma | cobalt ferrite single phase | CoFe$_{1.9}$Al$_{0.1}$O$_4$ | 4.2 |
| 2 | 2010 | $3.3 \times 10^{-2}$ | 40 | | | CoFe$_{1.8}$Al$_{0.2}$O$_9$ | 4.3 |
| 3 | 2200 | $5.2 \times 10^{-2}$ | 45 | | | CoFe$_{1.6}$Al$_{0.4}$O$_4$ | 4.4 |
| 4 | 2150 | $1 \times 10^{-1}$ | 45 | | | CoFe$_{1.0}$Al$_{1.0}$O$_4$ | 4.9 |
| 5 | 2005 | $1 \times 10^{-3}$ | 35 | | | CoFe$_{1.9}$Cr$_{0.1}$O$_4$ | 5.0 |
| 6 | 2113 | $2 \times 10^{-3}$ | 45 | | | CoFe$_{1.8}$Cr$_{0.2}$O$_4$ | 5.4 |
| 7 | 2148 | $8 \times 10^{-3}$ | 50 | | | CoFe$_{1.0}$Cr$_{1.0}$O$_4$ | 5.2 |
| 8 | 2130 | $3 \times 10^{-3}$ | 40 | | | CoFe$_2$O$_4$ | 5.9 |
| 9 | 2150 | $3.1 \times 10^{-3}$ | 40 | | | CoFe$_2$O$_4$ | 6.0 |
| 10 | 2015 | $3.3 \times 10^{-3}$ | 40 | | | CoFe$_{1.9}$Gd$_{0.1}$O$_4$ | 6.0 |
| 11 | 2138 | $3.5 \times 10^{-3}$ | 40 | | | CoFe$_{1.84}$Gd$_{0.16}$O$_4$ | 6.4 |
| 12 | 2140 | $6.7 \times 10^{-3}$ | 40 | | | CoFe$_{1.0}$Gd$_{1.0}$O$_4$ | 6.2 |
| 13 | 2130 | $3.4 \times 10^{-3}$ | 40 | | | CoFe$_{1.9}$Gd$_{0.1}$O$_4$ | 5.9 |

TABLE 5(b)-continued

| Sample No. | Film thickness (Å) | Pressure chamber (Torr) | Substrate temp (°C.) | Type of Plasma | result of X-ray analysis | Kerr rotation angle (780 nm wavelength) (degree) |
|---|---|---|---|---|---|---|
| 14 | 1980 | $1.0 \times 10^{-4}$ | 40 | | $CoFe_{1.9}Mn_{0.1}O_4$ | 6.4 |
| 15 | 2110 | $2.5 \times 10^{-3}$ | 40 | | $CoFe_{1.81}Mn_{0.19}O_4$ | 6.7 |
| 16 | 2140 | $8.1 \times 10^{-3}$ | 40 | | $CoFe_{1.0}Mn_{1.0}O_4$ | 6.3 |
| 17 | 2230 | $8.2 \times 10^{-3}$ | 40 | | $CoFe_{1.2}Mn_{0.8}O_4$ | 6.4 |
| 18 | 2050 | | 40 | | $CoFe_{1.9}In_{0.1}O_4$ | 6.2 |
| 19 | 2005 | | 40 | | $CoFe_{1.8}In_{0.2}O_4$ | 6.3 |
| 20 | 2130 | | 40 | | $CoFe_{1.0}In_{1.0}O_4$ | 6.4 |
| 21 | 2109 | | 40 | | $CoFe_{1.2}In_{0.8}O_4$ | 6.1 |
| 22 | 2130 | $3 \times 10^{-3}$ | 20 | ECR | $CoFe_2O_4$ | 5.9 |
| 23 | 1985 | $1.0 \times 10^{-4}$ | 20 | plasma | $CoFe_2O_4$ | 6.0 |
| 24 | 2215 | $6 \times 10^{-3}$ | 20 | magnetron | $CoFe_2O_4$ | 5.1 |
| 25* | 1980 | $2 \times 10^{-1}$ | 45 | discharge | amorphous | 0.2 |
| 26* | 950 | $4 \times 10^{-5}$ | 45 | | amorphous | 0.2 |

*Sample Nos. 25, 26 are comparative example.

Example 6

In the same manner as in Example 5, ferrocene ($Fe(C_5H_5)_2$), manganese acetylacetonate ($Mn(C_5H_7O_2)_3$) and zinc acetylacetonate ($Zn(C_5H_7O_2)_2$) were charged in the bubblers heated to 150° C. Bubbling argon gas 19 was caused to flow at 80 cc/min, 120 cc/min and 5 cc/min, and these vapors were introduced by a rotary pump onto a polyimide substrate in a reaction chamber at a reduced pressure. Then, oxygen ($O_2$) 20 as another reaction gas was caused to flow at a flow rate of 200 cc/min also on the polyimide substrate to react for about 20 min.

The gas pressure was $1.0 \times 10^{-2}$ Torr, the substrate temperature was about 40° C. and the high frequency power (13.56 MHz) was 500 W (5 W/cm$^2$). The thickness of the manganese zinc ferrite in a columnar structure deposited on the substrate was 1.2 μm. As the result of the measurement for the magnetic properties of the film, the magnetic retentiveness was 5.0 Oe and the saturation magnetization was 380 emu/cc.

The results are shown in Table 6 as Sample No. 1. The deposition temperature, magnetic retentiveness and the saturation magnetization of the ferrite film were measured while varying the pressure in the reaction chamber and the method of generating plasmas and the results are shown in Table 6 as Sample Nos. 2-4.

As described above in Examples 1-6, thin films of magnetic oxide materials prepared by the plasma CVD process have such a structure as shown in FIG. 2 where columns of a cylindrical cross sectional structure are orderly arranged on the organic film, that is, a so-called columnar structure. Such a film structure has a shape readily magnetizable in the direction perpendicular to the plane of the film and difficult to be magnetizable in the direction in parallel with the film plasma, thus, forming a perpendicular magnetization film due to so-called shape anisotropy, which is best suited to the magnetic recording medium at high density.

What is claimed is:

1. A method of manufacturing a magnetic thin film, wherein a gas of a metal organic compound containing elements constituting a magnetic material and oxygen as a reaction gas is decomposed in high frequency plasmas, magnetron discharge plasmas or electron cyclotron plasmas under a pressure from 10 to $10^{-4}$ Torr, and a thin film of magnetic oxide is deposited on a substrate at a temperature of up to 350° C. or with no heating of the substrate.

2. A method of manufacturing a thin film of magnetic oxide material as defined in claim 1, wherein the organic metal compound comprises barium and iron alkoxides.

3. A method of manufacturing a thin film of magnetic oxide material as defined in claim 1, wherein the organic metal compound comprises diethoxy iron ($Fe(OC_2H_5)_3$), diethoxy barium ($Ba(OC_2H_5)_2$), triethoxy cobalt ($Co(OC_2H_5)_3$) and triethoxy zinc ($Zn(OC_2H_5)_3$) or iron acetylacetonate ($Fe(C_5H_7O_2)_3$), cobalt acetylacetonate ($Co(C_5H_7O)_3$), barium acetylacetonate ($Ba(C_5H_7O_2)_2$), and zinc acetylacetonate ($Zn(C_5H_7O_2)_2$).

4. A method of manufacturing a thin film of magnetic oxide material as defined in claim 1, wherein the organic metal compound comprises strontium and iron alkoxides.

TABLE 6

| Sample No. | Fe—containing organic compound | Mn—containing organic compound | Zn—containing organic compound | Retentiveness (Oe) | saturation magnetization (emu/cc) | Pressure in chamber (Torr) | Plasma generation Method | Substrate temperature (C.°) |
|---|---|---|---|---|---|---|---|---|
| 1 | $Fe(C_5H_5)_2$ | $Mn(C_5H_7O_2)_3$ | $Zn(C_5H_7O_2)_2$ | 5.0 | 380 | $1 \times 10^{-2}$ | magnetron discharge | 40 |
| 2 | $Fe(C_5H_5)_2$ | $Mn(C_5H_5)_2$ | $Zn(C_5H_7O_2)_2$ | 3.2 | 385 | $2 \times 10^{-2}$ | magnetron discharge | 50 |
| 3 | $Fe(C_5H_5)_2$ | $Mn(C_5H_5)_2$ | $Zn(C_5H_7O_2)_2$ | 2.8 | 358 | $3 \times 10^{-3}$ | ECR discharge | 30 |
| 4 | $Fe(C_5H_5)_2$ | $Mn(C_5H_5)_2$ | $Zn(C_5H_7O_2)_2$ | 2.1 | 365 | $8 \times 10^{-4}$ | ECR discharge | 30 |

5. A method of manufacturing a thin film of magnetic oxide material as defined in claim 4, wherein $Sr(OR)_2$ where R represents an alkyl group is used as the alkoxide compound containing strontium.

6. A method of manufacturing a thin film of magnetic oxide material as defined in claim 4, wherein $Fe(OR)_3$ where R represents an alkyl group is used as the alkoxide compound containing iron.

7. A method of manufacturing a thin film of magnetic oxide material as defined in claim 1, wherein the organic metal compound comprises a cobalt-containing chelate, iron-containing chelate and M-containing chelate wherein M represents one of Al, Cr, Gd, Mn and In.

8. A method of manufacturing a thin film of magnetic oxide material as defined in claim 7, wherein the cobalt-containing chelate is cobalt acetylacetonate.

9. A method of manufacturing a thin film of magnetic oxide material as defined in claim 7, wherein the iron-containing chelate is iron acetylacetonate.

10. A method of manufacturing a thin film of magnetic oxide material as defined in claim 7, wherein the M-containing chelate where M represents one of Al, Cr, Gd, Mn, In comprises Al acetylacetonnate ($Al(C_5H_7O_2)_3$), Cr acetylacetonate ($Cr(C_5H_7O_2)_3$), Gd acetylacetonate ($Gd(C_5H_7O_2)_3$), Mn acetylacetonate ($Mn(C_5H_7O_2)_3$) and In acetyl acetone ($In(C_5H_7O_2)_3$).

11. A method of manufacturing a thin film of magnetic oxide material as defined in claim 1, wherein the organic metal compound comprises ferrocene ($Fe(C_5H_5)_2$), manganese acetylacetonate ($Mn(C_5H_7O_2)_3$) and zinc acetylacetonate: ($Zn(C_5H_7O_2)_2$).

* * * * *